Figure 1:
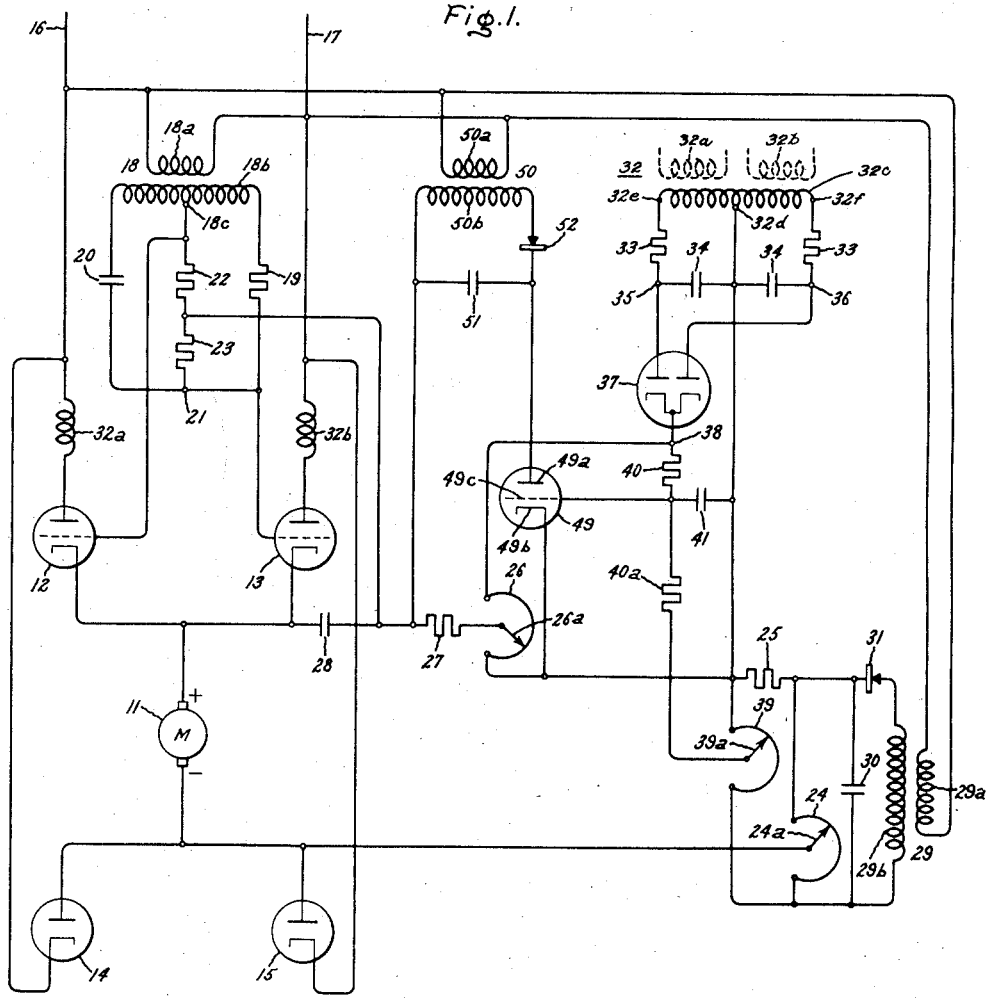

Aug. 11, 1959     E. F. KUBLER     2,899,629
CONVERSION NETWORK

Filed July 2, 1954     2 Sheets—Sheet 1

Inventor:
Ernest F. Kubler,
by J. Wesley Haubner
His Attorney.

Aug. 11, 1959 — E. F. KUBLER — 2,899,629
CONVERSION NETWORK

Filed July 2, 1954 — 2 Sheets-Sheet 2

Inventor:
Ernest F. Kubler,
by J. Wesley Haubner
His Attorney.

United States Patent Office 2,899,629
Patented Aug. 11, 1959

2,899,629
CONVERSION NETWORK
Ernest F. Kubler, Schenectady, N.Y., assignor to General Electric Company, a corporation of New York
Application July 2, 1954, Serial No. 441,040
5 Claims. (Cl. 321—39)

This invention relates to networks for converting alternating voltage to unidirectional voltage, and more particularly to an improved network for producing a unidirectional voltage from a discontinuous alternating voltage.

Conventionally, a conversion network comprises a rectifying means, such as, for example, a pair of electric valves connected to form a single phase full wave rectifier. In combination with such a network, a filtering means commmonly is employed to remove the ripples from the rectifier output thereby to provide a smooth unidirectional voltage. The conventional conversion network is not entirely satisfactory when required to operate upon an input of alternating voltage having substantial periods of zero voltage between succeeding half cycles of positive and negative voltage. (Voltage of this character will be described throughout the specification as a discontinuous alternating voltage.) The periods of zero voltage between each half cycle of the discontinuous alternating voltage input to the conventional conversion network will be reflected by similar gaps in the unidirectional voltage output, and the resulting discontinuity is characterized by a wave form having relatively great ripples. To remove these ripples and to produce a relatively smooth unidirectional voltage, it is necessary to employ relatively great filtering action. Consequently, the time constant of the filtering circuit will have a high value, and a relatively long time delay will be introduced between a variation in the magnitude of the discontinuous alternating voltage input and the corresponding change in the filtered unidirectional voltage.

Accordingly, my invention has for an object the provision of an improved conversion network for a discontinuous alternating voltage wherein the periods of zero voltage are reduced thereby providing a unidirectional output voltage which can be readily filtered to produce a relatively smooth unidirectional voltage with an extremely short time delay.

My invention has particular utility in control systems involving controlled discharge rectifier tubes. For example, a plurality of controlled discharge rectifier tubes may be arranged to form a full wave rectifier to supply a direct current load from a single phase alternating current source. A control voltage impressed upon the grid of each tube determines the instant at which the tube will discharge in each positive half cycle of anode voltage. To limit the current in each rectifier tube to a predetermined maximum value, thereby preventing damage to or destruction of the tube, a current limiting circuit commonly is used to provide a current limit voltage which contributes to the control voltage in a manner to limit the period of discharge in each tube. The current limiting circuit produces voltage determined by comparing a known reference voltage with a unidirectional signal voltage proportional to the value of a discontinuous alternating voltage derived from the pulsating current being conducted by the rectifier tubes. For accurate and rapid operation of the current limiting circuit, the current limit voltage must be a smooth, substantially ripple-free unidirectional voltage which responds to changes of rectifier current with an extremely short time delay.

Accordingly, a further object of my invention is to provide, for converting a discontinuous alternating voltage to a unidirectional signal voltage, a conversion network particularly adaptable for use in current limiting circuits of controlled discharge rectifier tube applications whereby the current limiting circuit will have an extremely high degree of accuracy and an exceptionally rapid speed of response.

One form of my invention is embodied in the current limiting circuit for a power rectifier control system in which a direct current motor is supplied from a single phase alternating current source. The power rectifier comprises a plurality of gaseous discharge type rectifier valves, including a pair of thyratrons, connected to form a full wave bridge type rectifier. A control voltage is applied to the grid of each thyratron to control the instant in which conduction will start in each positive half cycle of anode voltage. In order to limit the current conducted by the rectifier to a predetermined safe value, a current limiting circuit is provided to supply a component of control voltage that will retard the instant of discharge in each thyratron as a function of excessive rectifier current. The current limit component of control voltage is derived by comparing a known reference voltage with a unidirectional signal voltage which is an accurate measurement of the rectifier current. To obtain the unidirectional signal voltage, my improved conversion network is employed in combination with a current transformer having a pair of primary windings each connected in the anode circuit of one thyratron, a single centrally tapped secondary winding, and a common iron core. To prevent the undesirable condition of saturation in the current transformer core, the two primary windings are poled so that the unidirectional current pulses of the thyratrons will produce fluxes having opposite directions in the common core. As a result, a discontinuous alternating voltage is induced in the current transformer secondary winding. I connect an energy-storing circuit across each portion of the secondary winding, each circuit supplying one of a pair of simple rectifier valves arranged to form a full wave rectifier. These energy storing circuits store energy during positive and negative half cycles of the discontinuous alternating voltage and deliver the stored energy during the gaps between the half cycles. This action increases the smoothness of the alternating voltage before rectification without adding any time delay and thereby produces a partially filtered unidirectional signal voltage. As a result, a current limit voltage is obtained which will respond extremely rapidly to any variation of the rectifier current.

Figure 2A:
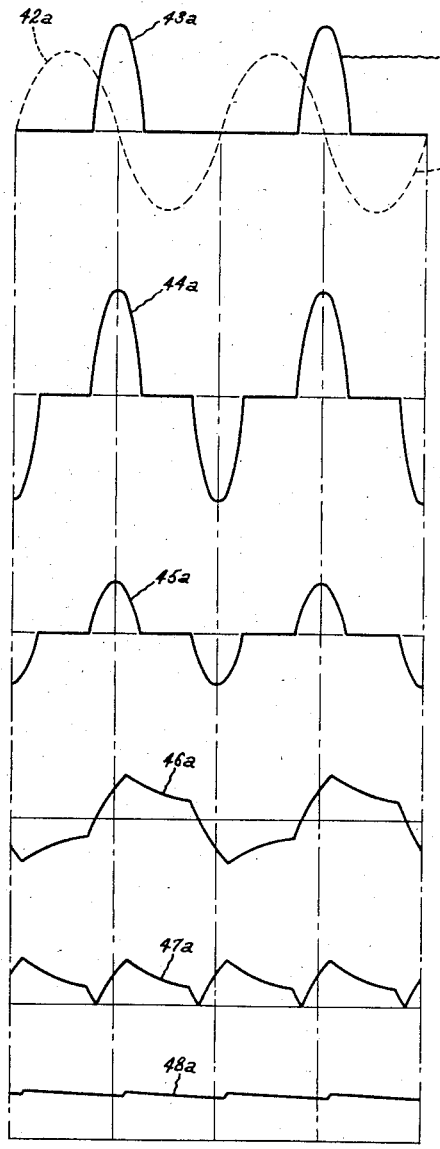
Figure 2B:
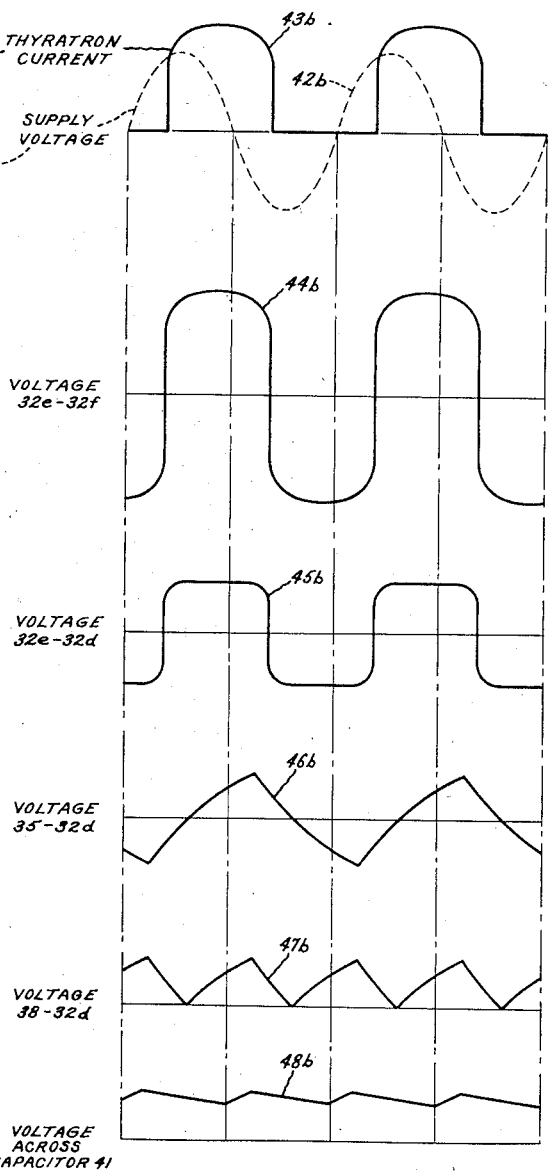

For a better and more complete understanding of the invention, reference should now be had to the following specification and to the accompanying drawings of which, Fig. 1 is a simple diagrammatical illustration of an embodiment of the invention in a control system in which a direct current motor is supplied from a single phase full wave bridge type power rectifier; and Figs. 2A and 2B are charts of characteristic curves which facilitate an understanding of the operation of the conversion network that is utilized to produce a unidirectional signal voltage which is an accurate indication of the current in the main rectifier, Fig. 2A illustrating a condition of pulsating rectifier current and Fig. 2B illustrating a condition of continuous rectifier current.

Referring now to Fig. 1, the armature of a direct current motor 11 is supplied from a single phase, full wave bridge type rectifier which is illustrated as comprising a plurality of gaseous discharge type rectifier valves including two grid controlled discharge valves 12 and 13, preferably thyratrons, and two-element valves 14 and 15, preferably phanotrons. This main rectifier is supplied from a suitable single phase source of alternating voltage which is represented by two supply wires 16 and 17. Each supply wire is connected to the anode of one thyratron and to the cathode of one phanotron. The cathodes of the two thyratrons 12 and 13 are connected to the positive terminal of the motor armature while the anodes of the two phanotrons 14 and 15 are connected to the negative terminal of the motor armature.

For the purpose of controlling the current which is supplied to the armature of the motor, means are provided for supplying to the grid of each of the thyratrons a voltage having an alternating component and a variable direct component. The variable direct component controls the instant at which each thyratron will discharge in each positive half cycle of its anode voltage and thus controls the average magnitude of the current conducted by each thyratron.

The alternating component is supplied by means of a grid voltage transformer 18 which is provided with a primary winding 18a connected across the supply wires 16 and 17 and a centrally tapped secondary winding 18b. A phase shifting bridge network, comprising a resistor 19 connected in series circuit relation with a capacitor 20, is connected across the secondary winding 18b. The voltage between the central tap 18c of secondary winding 18b and the common terminal 21 of the resistor 19 and capacitor 20 is displaced from the supply voltage by approximately 90 electrical degrees. In other words, the alternating voltage between points 18c and 21 will lag the anode voltage of each thyratron approximately 90 electrical degrees. A pair of voltage dividing resistors 22 and 23 are connected between points 18c and 21 to divide the voltage in two substantially equal parts. A connection is made from point 18c to the grid of thyratron 12 and from point 21 to the grid of thyratron 13. and approximately one half of the lagging voltage is supplied to the grid of each thyratron.

The variable direct component of the thyratron grid voltage is produced by means of a control circuit which is illustrated as comprising a potentiometer 24 in circuit with a resistor 25, and a second potentiometer 26 in circuit with another resistor 27. A slider 24a of potentiometer 24 is connected to the negative terminal of the motor 11 armature. The resistor 27 and the positive terminal of the motor armature are connected to opposite terminals of a capacitor 28, and the sum of the motor voltage and the various voltages in the control circuit will appear across this capacitor. The capacitor 28 is connected across the cathode to grid circuit of the thyratrons, and therefore the net voltage of the control circuit will determine the component of direct voltage which is added to the component of alternating voltage in the grid circuit.

The potentiometer 24 is supplied from a suitable source of constant direct voltage. This source is illustrated as comprising a control voltage transformer 29 having a single phase primary winding 29a connected across the supply wires 16 and 17 and a secondary winding 29b. A capacitor 30 is connected through a rectifier 31 to the terminals of the secondary winding 29b to provide a source of substantially constant direct voltage, and the potentiometer 24 is connected across capacitor 30. The voltage drop across the tapped portion of potentiometer 24 opposes the motor voltage and serves as a control voltage in the control circuit.

The speed of motor 11 is controlled by the magnitude of control voltage supplied. It will be assumed for the present that the second potentiometer 26 and resistor 27 are inactive and do not affect the voltage in the control circuit. Under this assumption, the voltage appearing across capacitor 28 would be determined by the difference of the opposing control and motor voltages. Suppose that it is desired to increase the speed of motor 11. Slider 24a is moved clockwise, as viewed in Fig. 1, to increase the value of control voltage in the control circuit. A condition of unbalance will result and the direct component of thyratron grid voltage will increase causing the grid voltage to become more positive with respect to the cathode voltage. The instant at which the thyratrons discharge in each positive half cycle of their anode voltages will be advanced thereby increasing the average value of armature current at the motor 11. As the motor speed increases, its counter E.M.F., which opposes the control voltage, will increase correspondingly to reduce the direct component of grid voltage. This retards the instant of discharge in the thyratrons until a new balanced condition is established in which the speed of motor 11 corresponds to the setting of control voltage.

For the purpose of limiting the current in the anode-cathode circuit of each of the thyratrons to a predetermined safe value, a current limiting circuit is provided for producing a unidirectional signal voltage proportional to the current in the anode-cathode circuit of each of the thyratrons, comparing it with a reference voltage, and deriving a current limit voltage which is introduced into the control circuit in a manner to decrease the direct component of the thyratron grid voltage. The current limit voltage will appear across part of potentiometer 26 and resistor 27. Thus, contrary to the assumption made above, these elements will affect the net voltage in the control circuit.

The current limit reference voltage is produced by means of a potentiometer 39 which is connected in series circuit with resistor 25 across the capacitor 30 and which is provided with a slider 39a. For producing the unidirectional signal voltage proportional to the current in the anode-cathode circuits of the thyratrons, a current transformer 32 is used in combination with a conversion network comprising a pair of energy storing circuits and suitable rectifying means.

Current transformer 32 comprises two primary windings 32a and 32b, each connected in circuit with a different one of the pair of supply wires 16 and 17, and a single secondary winding 32c having a central tap 32d and outside terminals 32e and f. The currents in the primary windings 32a and 32b, upon conduction by the respective thyratrons 12 and 13, produce flux in the current transformer 32 having opposing directions. Across each half of the secondary winding 32c is connected an energy storing circuit.

In the preferred embodiment of my invention, although not limited thereto, each energy storing circuit comprises a resistor 33 and a smoothing capacitor 34 connected in series circuit relation. The resistor 33 is connected to an outside terminal of the secondary winding 32c, and the smoothing capacitor 34 is connected to central tap 32d. The common connections between each resistor and capacitor are identified by reference characters 35 and 36. The preferred rectifying means illustrated in Fig. 1, although not limited thereto, comprises a duplex electric valve 37 of the twin diode type having a pair of separate anodes and a pair of interconnected cathodes enclosed in a common envelope. A connection is made from the common connection in each energy storing circuit, 35 and 36, to a different anode. The cathodes are connected to a terminal 38. Potentiometer 26 is connected between terminal 38 and central tap 32d to provide a path for direct current from the rectifier cathode to transformer secondary winding 32c. The voltage drop across potentiometer 26 comprises the unidirectional signal voltage.

The operation of the conversion network to produce a unidirectional signal voltage which is an accurate measurement of the current in the anode-cathode circuits of the thyratrons will be readily understood by referring to the characteristic curves illustrated in Figs. 2A and 2B. The following basic numbers have been used to identify the curves: Curve 42 represents the supply voltage across the pair of supply wires 16—17; curve 43 represents the anode-cathode current conducted by thyratron 12 which is also the current in the current transformer primary winding 32a; curve 44 represents the induced voltage appearing across the current transformer secondary winding 32c between outside terminals 32e and 32f;

curve 45 represents the voltage appearing across the portion of the secondary winding 32c from terminal 32e to central tap 32d; curve 46 represents the voltage which is present across capacitor 34 of one energy storing circuit, between points 35 and 32d; and curve 47 represents the rectified signal voltage between the cathode terminal 38 of electric valve 37 and central tap 32d. Fig. 2A illustrates the characteristic curves for a condition of pulsating current in the main rectifier which results from a retarded instant of thyratron discharge in each positive half cycle of anode voltage, and the suffix a has been added to all of the basic curve numbers to indicate this condition. Fig. 2B illustrates the characteristic curves for a condition of continuous current in the main rectifier resulting from an advanced instant of discharge in the thyratrons, and the suffix b has been added to all of the basic curve numbers to distinguish this condition from that of Fig. 2A. The abscissae of these curves represent time, and for the sake of simplicity a period of time has been illustrated that corresponds to a steady state condition.

During the period in which thyratron 12 is conducting, as represented by curve 43, the current in the current transformer primary winding 32a will induce a voltage in the secondary winding 32c that is positive toward terminal 32e. During the period in which thyratron 13 is conducting, which could be represented by a curve identical to but displaced 180 electrical degrees from curve 43, the current in the primary winding 32b will induce a voltage in the secondary winding 32c that is positive toward terminal 32f. Thus the voltage appearing across the secondary winding 32c between outside terminals 32e and f will be an alternating voltage represented by curve 44. For the condition of pulsating rectifier current, this voltage will be discontinuous, as shown by curve 44a. The voltage from terminal 32e to central tap 32d of the secondary winding 32c, as indicated by curve 45, is approximately one-half the magnitude and in phase with curve 44, while the voltage from terminal 32f to central tap 32d, not shown, will be approximately one half the magnitude but 180 electrical degrees out of phase with curve 44. The average value of the current transformer secondary voltage will be directly proportional to the average value of the main rectifier current.

The conversion network operates upon the voltage of the current transformer secondary winding 32c to convert this alternating voltage to a unidirectional signal voltage directly proportional to the average value of the alternating voltage. A stored energy circuit comprising resistor 33 and capacitor 34 is connected across each portion of the secondary winding 32c. During each cycle of the alternating voltage, each capacitor 34 alternately charges and discharges with alternating polarity. The peak of each voltage pulse is flattened as energy is stored by a capacitor, with resistor 33 delaying the charging and discharging action of the associated capacitor. As a result, the capacitor maintains a supply of voltage during the gap between successive positive and negative voltage pulses. The resulting voltage across capacitor 34 from connection 35 to central tap 32d is represented by curve 46. For the condition of discontinuous alternating voltage, as shown by curve 46a, capacitor 34 will discharge after each negative voltage pulse through a discharge circuit comprising resistor 33 and the portion of transformer secondary winding 32c located between terminal 32e and central tap 32d. During the gap following each positive voltage pulse, capacitor 34 delivers stored energy to valve 37, which valve is now conducting due to positive voltage being applied to its anode. The impedance of the discharge circuit comprising resistor 33 together with transformer 32 is sufficiently great during the gap between voltage pulses to insure that the positive charge stored by capacitor 34 will not be significantly diverted through these elements while valve 37 is conducting. The wave form of voltage across capacitor 34 between connection 36 and central tap 32d of winding 32c is identical to but displaced 180 electrical degrees from that illustrated by curve 46, and, therefore, one anode of valve 37 is always energized by positive voltage. Potentiometer 26 is connected between the cathode terminal 38 of valve 37 and central tap 32d, and a unidirectional signal voltage having the partially filtered or smoothed characteristic illustrated by curve 47 is developed across potentiometer 26 as a result of the current conducted by valve 37.

For the purpose of comparing the unidirectional signal voltage with the current limit reference voltage, a voltage dividing network comprising resistors 40 and 40a is provided, and a current limit voltage is derived therefrom by means of an electric valve 49. As shown in Fig. 1, valve 49 is a suitable triode tube having an anode 49a, a cathode 49b and a control grid 49c. The anode voltage of valve 49 is supplied from a suitable source of constant voltage which is illustrated in Fig. 1 as comprising a single phase control voltage transformer 50 having a primary winding 50a connected across the pair of supply wires 16 and 17 and a secondary winding 50b. A capacitor 51 is connected through rectifier 52 to the terminals of the secondary winding 50b to provide a source of constant direct voltage. The anode 49a of valve 49 is connected to one side of the capacitor 51. The combination of resistor 27 and part of potentiometer 26 is connected between the cathode 49b and the other side of capacitor 51, and the voltage drop across this combination will be determined by the value of anode-cathode current conducted by valve 49. This voltage drop, which is the current limit voltage, will tend to oppose the net voltage in the control circuit and thereby decrease the direct component of the thyratron grid voltage to limit the period of discharge in each thyratron.

The value of anode-cathode current conducted by valve 49 is controlled by the voltage on grid 49c, and the grid voltage in turn is determined by the voltage dividing network. The resistors 40 and 40a are connected in series circuit relation between slider 39a of potentiometer 39 and terminal 38. The common connection between resistors 40 and 40a is connected to control grid 49c. The voltage dividing network compares the unidirectional signal voltage across potentiometer 26, which voltage will vary as a direct function of the average value of current in the main rectifier, with the current limit reference voltage determined by the position of the slider 39a, and a control voltage determined by the difference therebetween is impressed upon grid 49c. A small smoothing capacitor 41 is connected across the cathode to grid circuit of valve 49 to remove the ripples from the grid voltage to render this voltage sufficiently smooth to give accurate control over the valve.

As long as the current conducted by thyratrons 12 and 13 is less than the predetermined safe value, the voltage of control grid 49c, as determined by the voltage dividing network's comparison of the unidirectional signal voltage with a preset value of reference voltage, will have a sufficiently negative value to prevent conduction of valve 49. However, if the current conducted by either thyratron exceeds the predetermined value, the grid voltage of valve 49 immediately becomes sufficiently less negative to render the valve 49 conducting. The resulting current limit voltage across resistor 27 and part of potentiometer 26 will reduce the direct component of the voltage supplied to the grids of the thyratrons. The instant at which the thyratrons will discharge in each positive half cycle of their anode voltages is thereby retarded, and the period of discharge and thus the current conducted by each thyratron is correspondingly decreased. This action continues until the current conducted by each thyratron is decreased to a value that is equal to or less than the value which is preset on the current limit potentiometer 39.

The filtered control voltage of grid 49c is represented by curve 48 in Figs. 2A and 2B. For optimum operating results in the control system, this voltage must reflect accurately and extremely rapidly any change in the main rectifier current. The smoothing capacitor 41 necessary to produce a smooth control voltage will introduce an undesirable time lag in the response of this voltage to an abrupt change in the thyratron current. Therefore, a capacitor 41 will be used having the minimum value of capacitance that will maintain the maximum permissable ripple in the control voltage. The operation of the conversion network to produce a partially filtered unidirectional signal voltage permits the use of a smaller value of capacitance than would otherwise be possible and thereby reduces to an exceptionally short time the overall time delay of the current limiting circuit. The smoothing capacitors 34 in the energy storing circuits of the conversion network contribute no time lag because they are alternately charged and discharged with alternating polarity.

It will be noted that the control voltage of grid 49c is smoother for pulsating rectifier current, curve 48a, than for continuous rectifier current, curve 48b. In other words, the partially filtering action of the conversion network is most effective when supplied from a source of discontinuous alternating voltage having periods of zero voltage between each positive and negative half cycle. However, in rectifier applications requiring regulation of current over a wide range, i.e., the normal operating current of the main rectifier may vary from infrequent pulses to continuous, the related requirements of a smooth control voltage and a high speed of response will nevertheless be met with optimum results. Thus, my conversion network is well suited for applications requiring the conversion of an alternating voltage of variable discontinuity.

The unidirectional signal voltage appearing across potentiometer 26 directly affects the net voltage of the control circuit. The proper amount of this voltage, which is directly proportional to the main rectifier current, is tapped by slider 26a and contributes to the direct component of the thyratron grid voltage in a manner to adjust the instant of discharge in the thyratrons to compensate for the IR drop in motor 11.

While I have shown and described a preferred form of my invention by way of illustrations, many modifications will occur to those skilled in the art. I thereby contemplate by the appended claims to cover all such modifications as fall within the true spirit and scope of my invention.

What I claim as new and desire to secure by Letters Patent of the United States is:

1. In a network for converting discontinuous alternating voltage to a unidirectional voltage, a source of discontinuous alternating voltage derived from a current transformer secondary winding having a pair of outside terminals and a central tap, a pair of energy storing circuits each comprising a resistor in series circuit with a capacitor connected between a different said outside terminal and said central tap, and rectifying means comprising a pair of electric valves of the diode type each having an anode connected to the common connection between said resistor and capacitor of a different said energy storing circuit and a cathode connected to a common output terminal thereby to provide a partially filtered unidirectional output voltage between said output terminal and said central tap.

2. A control system comprising a source of alternating voltage, an electric energy storing circuit coupled to said source, rectifying means connected to said circuit for converting said alternating voltage to a unidirectional signal voltage proportional thereto, a source of unidirectional reference voltage, and voltage comparing means supplied from said signal and reference voltages for deriving a unidirectional control voltage having a magnitude which is determined by the difference therebetween.

3. A control system comprising a source of variable discontinuous alternating voltage derived from a centrally tapped secondary winding of a current transformer, a pair of energy storing circuits each connected across a different portion of said secondary winding, rectifying means coupled to said circuits, a resistive element connected between said rectifying means and the central tap of said secondary winding, said resistive element providing a source of partially filtered unidirectional signal voltage in response to current being conducted by said rectifying means, a source of adjustable unidirectional reference voltage, a voltage dividing network supplied from said signal and reference voltages for deriving a unidirectional control voltage determined by the difference therebetween, a filtering capacitor connected in parallel with said control voltage to render said control voltage substantially ripple-free, and means utilizing said control voltage to produce an output voltage whenever said control voltage exceeds a predetermined value.

4. In a control system for supplying a direct current load from a single phase source of alternating current, a pair of controlled discharge rectifier tubes each connected in a different wire of said single phase source, a current transformer having a pair of primary windings each responsive to the current in a different said tube and a common centrally tapped secondary winding having an alternating voltage induced therein by the currents conducted in said primary windings, a pair of energy storing circuits each connected across a different portion of said secondary winding, rectifying means coupled to said circuits, means for producing a partially filtered unidirectional signal voltage in response to the current conducted by said rectifying means, a source of adjustable unidirectional reference voltage, means connecting said signal voltage producing means and said reference voltage source in series circuit, a voltage dividing network supplied from said signal and reference voltages for deriving between the voltage dividing network and said connecting means a unidirectional control voltage determined by the difference between said signal and reference voltages, a filtering capacitor connected in parallel with said control voltage to render said control voltage substantially ripple-free, means utilizing said control voltage to produce a voltage output whenever said control voltage exceeds a predetermined value, and means supplying said voltage output to said tubes in a manner to control the period of discharge in each said tube thereby to limit the maximum current conducted by said tubes to a safe value.

5. In a conversion network for a discontinuous alternating voltage derived from a secondary winding of a current transformer, said secondary winding having a central tap and a pair of outer terminals, a pair of capacitors each having first and second terminals, said first terminals of both capacitors being connected to said central tap, a pair of resistors each connected between the second terminal of one of said capacitors and a different one of said outer terminals, and rectifying means connected across each of said capacitors to conduct current in one direction only.

References Cited in the file of this patent

UNITED STATES PATENTS

| | | |
|---|---|---|
| 1,488,489 | Gabriel | Apr. 1, 1924 |
| 1,829,254 | Asch | Oct. 27, 1931 |
| 1,844,977 | Replogle | Feb. 16, 1932 |
| 1,897,249 | Fleming | Feb. 14, 1933 |
| 2,052,413 | Lord | Aug. 25, 1936 |
| 2,141,369 | Alexander | Dec. 27, 1938 |
| 2,177,841 | Schilgen | Oct. 31, 1939 |
| 2,417,272 | Short | Mar. 11, 1947 |
| 2,468,578 | Vladmir | Apr. 26, 1949 |